DIGITAL CROSSPOINT SWITCH

Filed Sept. 26, 1961 4 Sheets-Sheet 1

INVENTORS R. C. STIEFEL
H. W. TOWNSEND
BY John K. Mullarney
ATTORNEY

DIGITAL CROSSPOINT SWITCH

Filed Sept. 26, 1961 4 Sheets-Sheet 2

INVENTORS R. C. STIEFEL
H. W. TOWNSEND
BY John K. Mullarney
ATTORNEY

INVENTORS: R.C. STIEFEL
H.W. TOWNSEND

BY John K. Mullarney

ATTORNEY

July 26, 1966 R. C. STIEFEL ET AL 3,263,030

DIGITAL CROSSPOINT SWITCH

Filed Sept. 26, 1961 4 Sheets-Sheet 4

INVENTORS: R.C. STIEFEL
H.W. TOWNSEND

BY John K. Mullarney

ATTORNEY 3,263,030
Patented July 26, 1966

1

3,263,030

DIGITAL CROSSPOINT SWITCH

Rudy C. Stiefel, New York, N.Y., and Harvard W. Townsend, Whippany, N.J.; said Stiefel assignor to Radio Corporation of America, a corporation of Delaware, and said Townsend assignor to Bell Telephone Laboratories, Incorporated, New York, N.Y., a corporation of New York Filed Sept. 26, 1961, Ser. No. 141,249
8 Claims. (Cl. 179—15)

Figure 1:
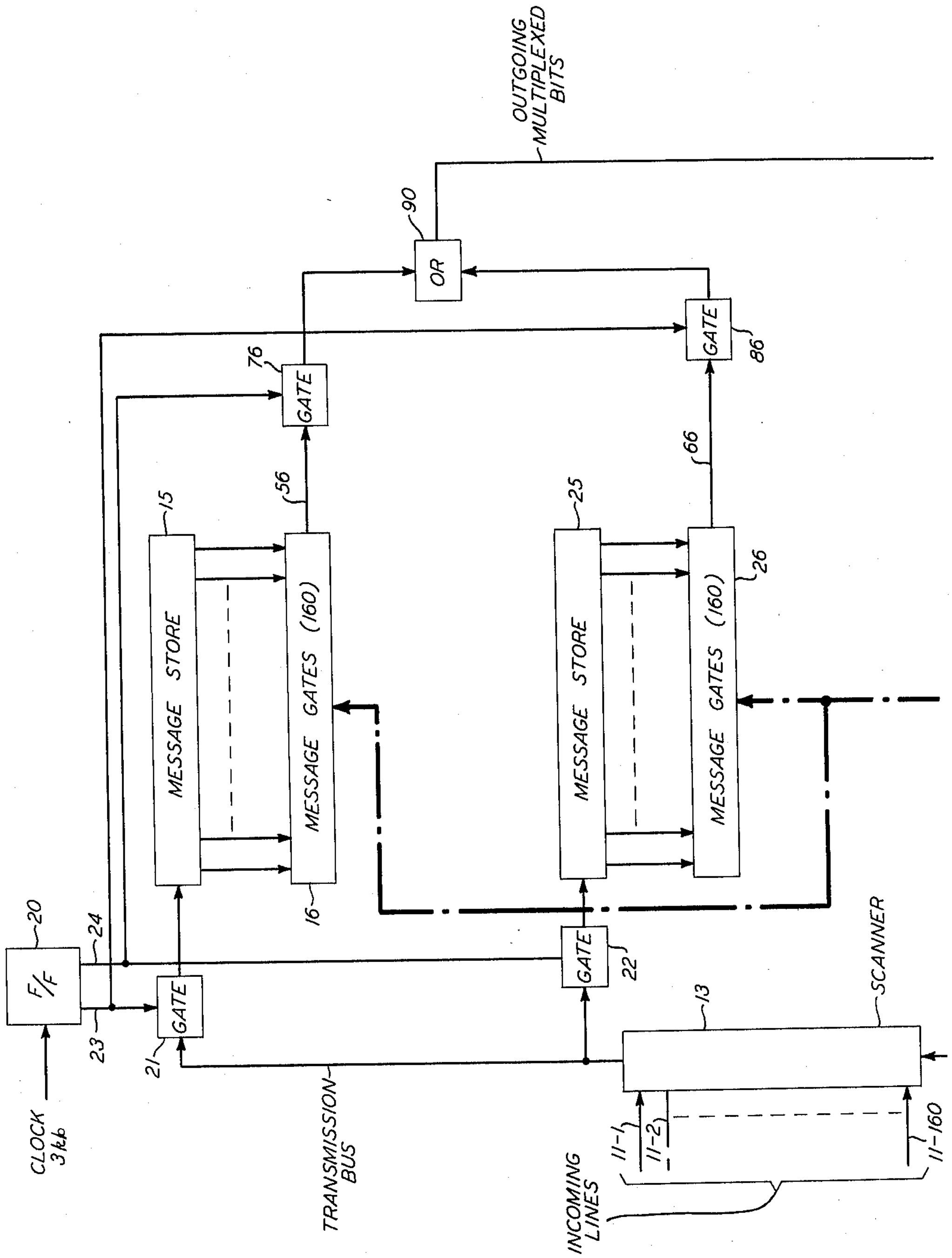

This invention relates to switching systems, and more particularly to electronic telephone switching systems.

It is presently general practice that a connection through a telephone exchange, as between a calling and a called line or a calling line and an intra-office trunk, be a unique path defined by relays or other switching elements. Each such path is individual to the connection that has been set up and is assigned to that connection for the duration of the call. Thus, a certain amount of equipment, depending on the number of lines served and the expected frequency of service, may be considered as being in a pool where it can be chosen and assigned for a particular call. Such a system arrangement is referred to as "space separation" or "space division switching" and privacy of conversation is assured by the separation of individual messages in space.

It is essential, for reasons of economy, that some degree of "concentration" be employed in a space division switching network. The quoted term has reference to those schemes wherein the number of possible switching paths through a switching network is substantially less than the number of incoming and/or outgoing lines. Because of the low probability that all lines will request service at the same time, most commercial traffic can be concentrated without seriously impairing the quality of the service. However, a blocking problem is introduced, in the aforementioned space division switching networks, when the traffic from the subscribers' lines exceeds the number of available paths therein. Blocking is generally permissible, and even desirable for economic reasons, in commercial systems. In some instances, however, blocking can be a decided disadvantage. For example, in a military communications system carrying important command and control traffic the demand for simultaneous connections will be very high in an emergency and no blocking can be tolerated at this time.

Accordingly, it is one of the objects of the present invention to provide a simplified, inexpensive, non-blocking electronic switching system.

The connections between calling and called lines may also be made by sharing a single path on a "time division" or "time separation" basis. Privacy of transmission is assured in such systems by separation of the calls in time. Thus, each call is assigned to the common path for an extremely short but rapidly and periodically recurring interval, and the connection between any two lines in communication is completed only during these short intervals or time slots. Samples which retain essential characteristics of the voice or other signal are transmitted in these time slots and are utilized in the called line to reconstruct the original signal so that the reception of signals of any complexity through the time division network is entirely satisfactory.

It is necessary that such a time division switching network identify and remember which lines have been assigned to which time slots in the constantly recurring office cycle. Priorly this has been done by employing two cathode beam tubes each having a plurality of targets assigned and connected to individual lines. A system of this type is described in P. R. Adams-D. H. Ransom Patent 2,492,344, December 27, 1949.

The employment of such tubes in the talking path in-

2 troduces considerable loss as cathode ray tubes are low current, low power output devices. Additionally, the memory requirements and the gating under control of the memory becomes onerous in such systems.

More recent time division switching networks make use of dynamic memory devices such as ultrasonic and magnetostrictive delay lines to control the various gating operations which effectively interconnect, for short intervals, the calling and called lines. These delay lines, however, are lossly and hence the timing signals continuously recirculated therein must constantly be regenerated. Further, the various delay lines are susceptible to drift and so various circuit arrangements of varying degrees of complexity are necessary to overcome the same.

It is a further object of the present invention to provide an improved, yet simplified, time division type switching network.

A more general object of the instant invention is to effect simplification over cross-point type switching systems and over known schemes of time division switching.

These and other objects are attained in accordance with the present invention wherein a plurality of incoming subscriber lines, and/or trunks, are connected individually and in time sequence to a common transmission bus. The multiplexed message bits are then temporarily stored, a frame at a time, in a shift register. The stored message bits are thereafter read out of the register through message gates in such a manner that the time sequence of the outgoing message bits represents the desired outgoing or "switched" order. This read out or switching is effected by storing the forwarding address in a matrix store so that each such address controls one of the aforementioned message gates. A line scan generator serves to cyclically and sequentially generate signals that correspond to each outgoing line. These signals are continuously compared with the forwarding address data in said matrix store and each time a "match" occurs one of the aforementioned message gates opens to read out the appropriate message bit. Accordingly, when viewed in one way, the inventive principle consists of changing the time sequence of the incoming multiplexed message bits into a different order, under the control of the forwarding addresses placed in the aforementioned matrix store. The order of the outgoing message bits corresponds to the outgoing lines to which the respective bits are to be routed. This routing is accomplished by actuating, successively and in time sequence, line gates respectively associated with said outgoing lines.

A feature of the instant switching network is that it regenerates (that is, recreates without distortion) the message bits in the process of transferring them to the outgoing lines or trunks, without providing circuitry specific to this purpose. The prior art cross-point switching systems normally require regenerative repeaters for each line and thus substantial economies are realized in a switching system constructed in accordance with the present invention.

Figure 2:
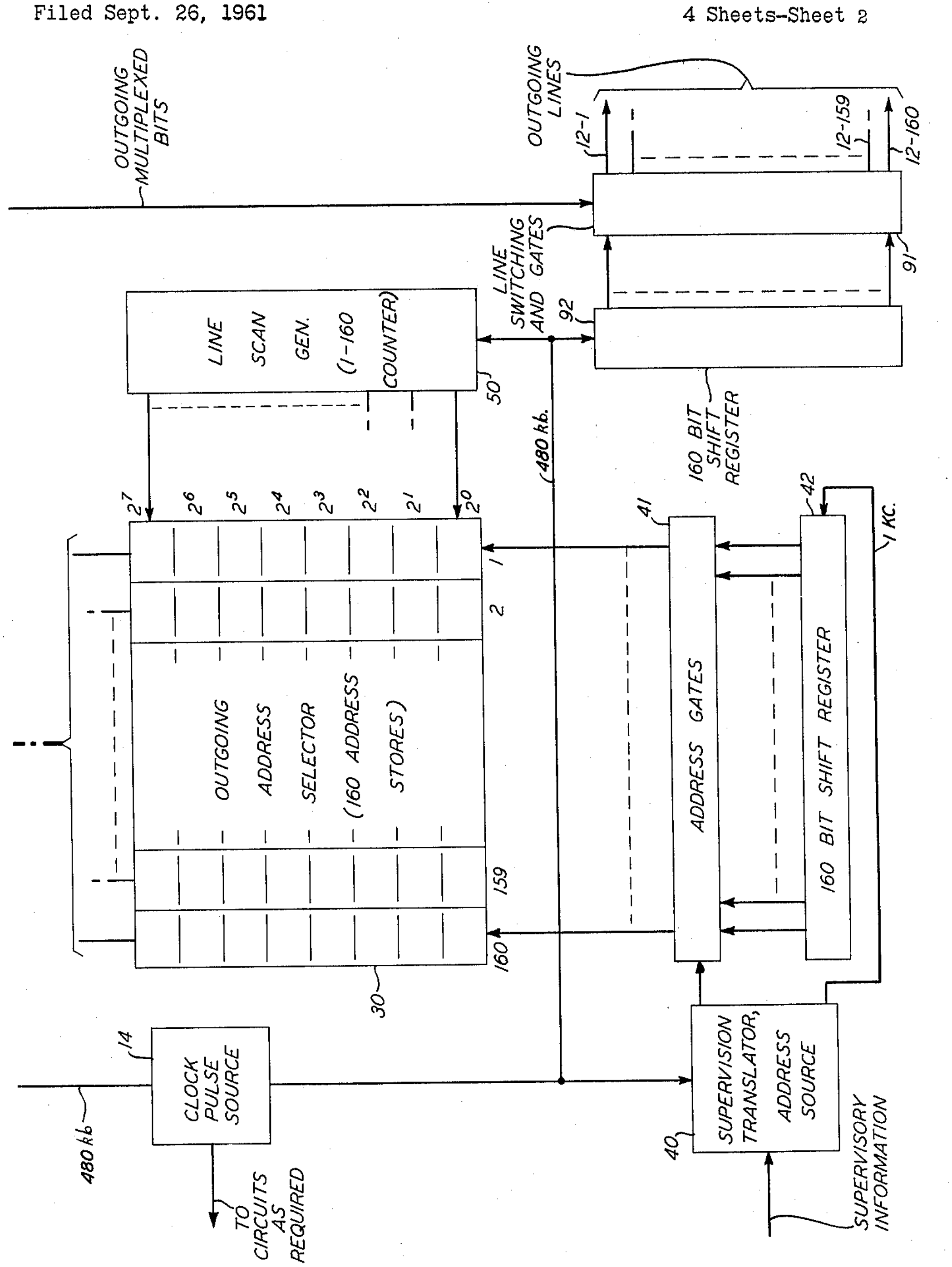
Figure 3:
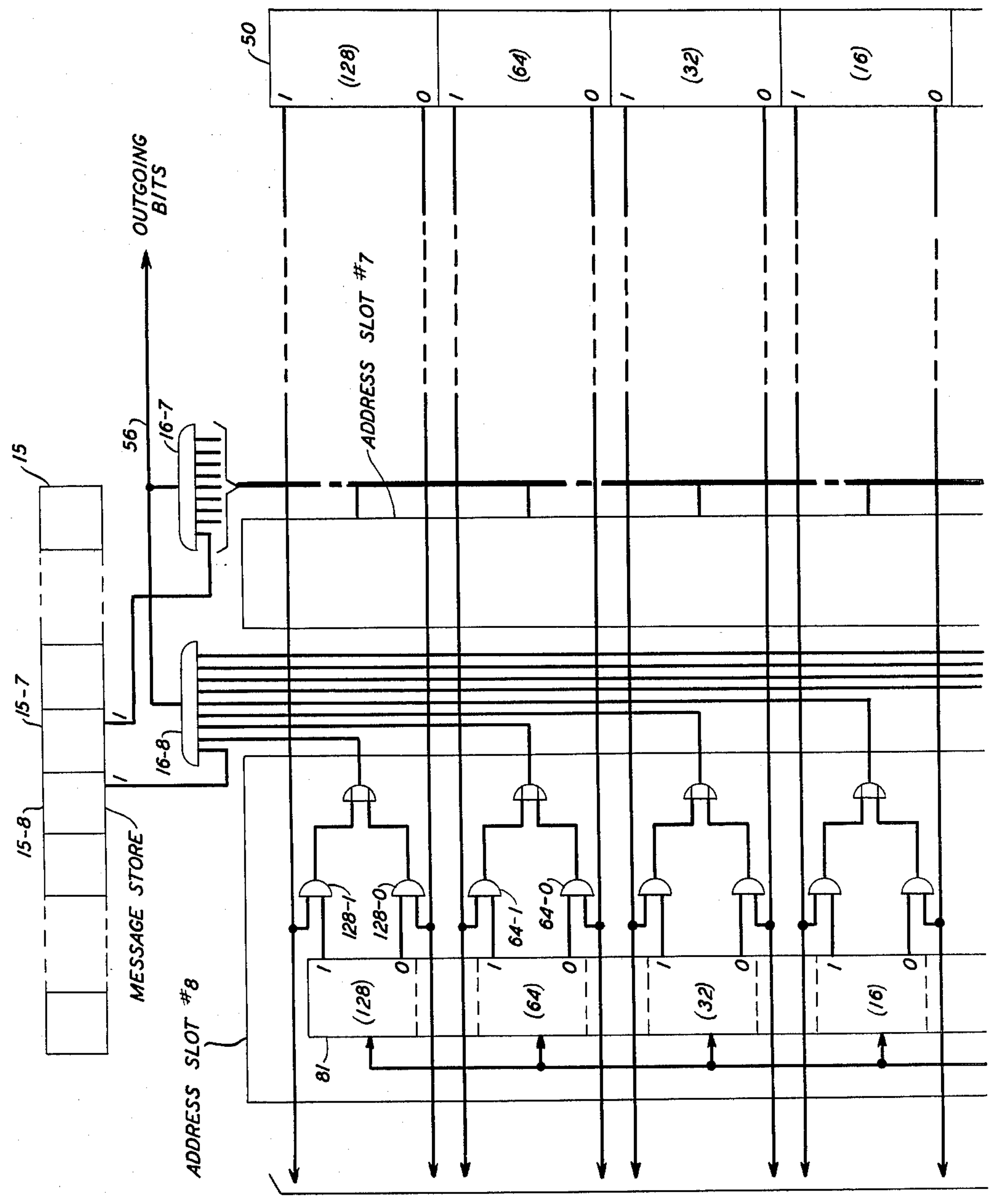
Figure 4:
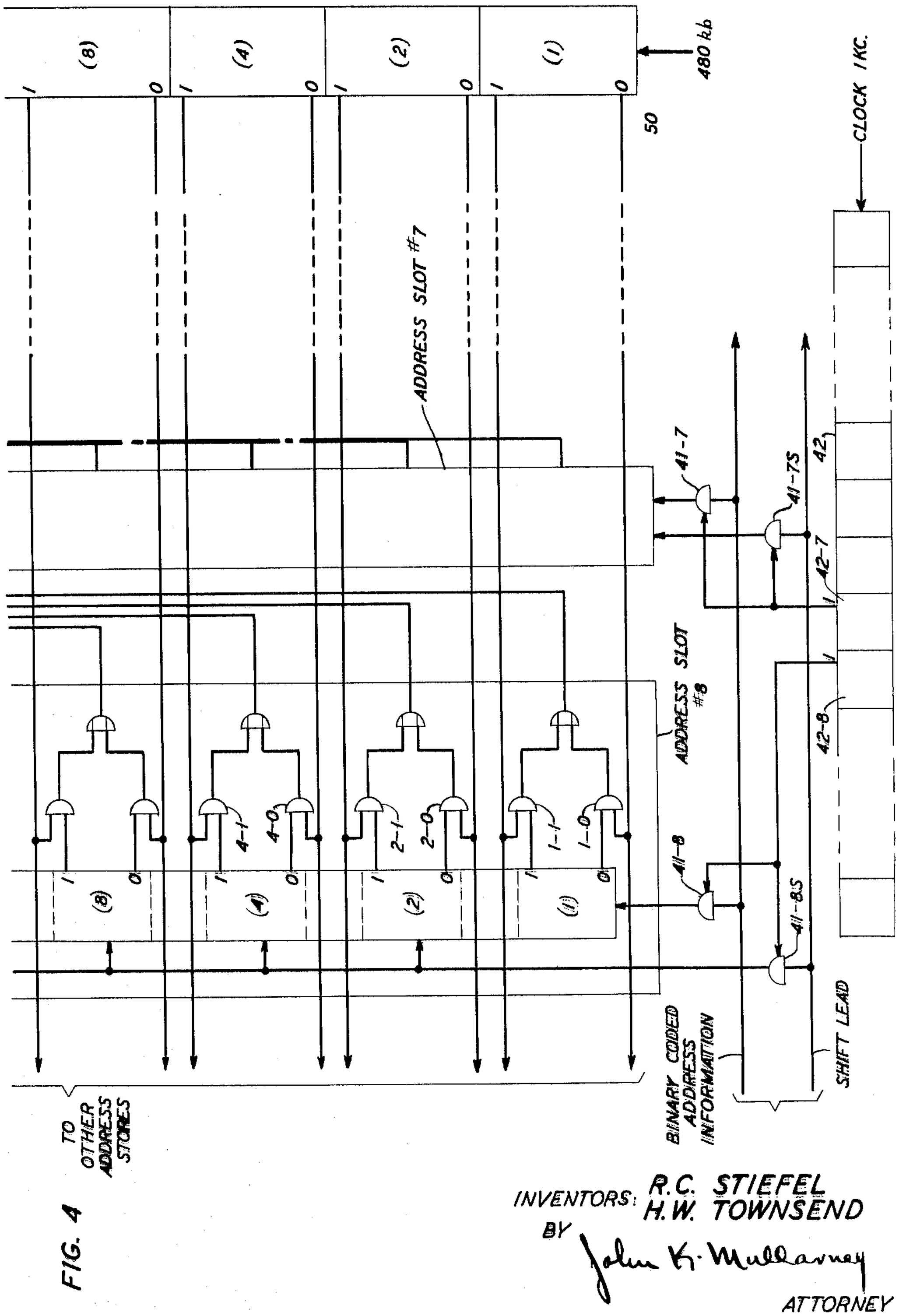

Other features and advantages of the invention will become more apparent by reference to the following description taken in conjunction with the accompanying drawings, wherein:

FIGS. 1 and 2 when placed top to bottom show a schematic diagram in block form of a switching network in accordance with the principles of the present invention; and FIGS. 3 and 4 when placed top to bottom show a detailed schematic diagram in block form of a portion of the switching network of FIGS. 1 and 2.

Turning now to FIGS. 1 and 2 of the drawings, a digital cross-point switching network in accordance with the invention serves to interconnect a plurality of incoming subscriber lines 11 to a plurality of outgoing lines 12.

As the name implies, the instant network is intended to switch messages that are in digital form. Digital transmission systems have become increasingly popular in recent years for several very important reasons. First, crosstalk problems are much more troublesome between circuits carrying analog signals than between circuits carrying digital signals. Second, digital transmission to and through the central office permits connections which have a constant net loss, a constant bandwidth and which are relatively free of transmission noise. Further, the quality of transmission is substantially independent of the transmission medium, makeup and length. And lastly, the rapidly increasing use of data processing devices will make digital data transmission much more important in the future.

For illustrative purposes, it shall be assumed that 160 incoming lines are to be interconnected with 160 outgoing lines, and that the line message bit rate is 3 kb. or 3,000 bits per second. The message bit stream of any given line might typically comprise digitalized teletypewriter signals, or speed buffered data from any of the various data devices known to those skilled in the art, or even multiplexed, encoded, vocoded voice signals. The time division multiplexing or vocoder signals has been satisfactorily demonstrated heretofore; see for example the article entitled "Simple Multiplex Vocoder" by A. R. Billings, in Electronic and Radio Engineer, May 1959, pages 184–188. As will be clear hereinafter, the switching of the digital data information cross-office in the instant system is not dependent upon or influenced by the particular pulse coding scheme utilized in the information bit stream.

The scanner 13 continuously scans the incoming lines 11 and interconnects the same individually and in time sequence to the common transmission bus. This scanning is carried out under the control of timing pulses from the clock pulse source 14 and, for the assumed case, will be at an overall scanning rate of 480 kb. (160 lines multiplied by 3 kb. per line). Typically, the digital data of the respective lines are synchronized with each other under the control of a master synchronizing circuit (not shown) located either at the central office or remotely. Such a master "sync" circuit will, of course, in turn be synchronized with the clock pulse source. Alternatively, the scanning scheme can be similar to that disclosed in the patent to Budlong-Drew-Harr, No. 2,955,165, October 4, 1960, and the digital data of the respective lines need not then be necessarily synchronized with each other. Thus, it should be clear to those in the art that the instant invention is in no way limited to any particular method of scanning the incoming subscriber lines and any one of numerous prior art scanning schemes can be utilized to advantage herein.

The multiplexed message bits on the common transmission bus are temporarily stored, a frame at a time, in the message store registers 15 and 25. A frame in this instance consists of 160 time slots and it includes each of the bits detected on the incoming lines during one complete scan of the same from the first or uppermost incoming line 11–1 to the last or lowermost line 11–160. Thus, the bits appearing on incoming line 11–1 will appear in the first time slot of each frame, the bits on the second incoming line 11–2 occupy the second time slot, et cetera.

Two message stores, (that is, 160 bit shift registers) are utilized herein so that the digital data may be read into one store while read out from the other is taking place, and vice versa. The flip-flop 20 and enabling gates 21, 22 effect this result. The flip-flop is driven at the frame rate (for example, 3 kb.) by trigger pulses derived from the clock pulse source, and this drive is in synchronism with the successive frames. Thus, if the lead 23 is energized during a given frame, the multiplex message bits will be delivered serially to the input of message store 15 via gate 21. For the next succeeding frame or scan of the incoming lines the lead 24 is energized and the message bits are then delivered to message store 25 via the gate 22. In similar fashion, the succeeding frames are delivered alternately to the message stores 15 and 25. As will be explained in greater detail hereinafter, the read out from these stores is likewise conducted in an alternate fashion, but read out is staggered with respect to read in, for the above-stated reason.

The message stores 15 and 25 can compromise conventional shift registers of 160 storage stages each. The message bits stored in register 15 are read out, in a manner to be described, via message gates 16, while the bits in register 25 are read out via message gates 26. This read out is effected by storing the outgoing or forwarding addresses in the address selector 30 in a manner such that each address controls one of the aforementioned message gates.

The address selector 30 consists of 160 address slots, each of which is composed of an 8-bit shift register. These address slots are symbolically illustrated in FIG. 2 by the appropriately designated vertical columns. The forwarding addresses of the 160 outgoing lines are respectively stored in these 160 address slots. Further, each address slot is physically associated, by electrical interconnection, with a particular message gate in each of the two message gate groups 16 and 26.

The forwarding address information stored in selector 30 is derived from the supervision translator and address source 40. While the translator-directory unit 40 is illustrated as a separate entity, it is, in reality, a usual part of the control apparatus employed in the common control type of telephone switching central office.

Supervisory information in the form of either dial, multi-frequency or coded digital signals representing the connection desired by the originator of a call are extracted from the physical subscriber line transmission path by any of several well known methods and carried to the common control circuitry which has access to directory information stored in a permanent memory. The common control performs a translation function which consists of decoding the outgoing connection desired by the originator of the call and preparing to forward this information in a binary coded form to the address selector. Prior art telephone switching systems have employed a variety of common control circuit arrangements which may be utilized herein. For example, a common control arrangement similar to that disclosed in the aforementioned patent to Budlong-Drew-Harr can be advantageously utilized to perform the common control tasks described above.

The binary coded, forwarding address information, derived from the supervisory information delivered to the translator-directory unit 40, is, in turn, delivered to the address selector 30, via the address gates 41. These gates are energized or opened individually and in time sequence under the control of register 42. This latter register may comprise any conventional shift register, preferably of the recirculating type, having 160 storage stages. The address gates 41 must stay open a sufficient length of time to allow the serial transmission of the binary coded data to the address selector. Accordingly, the recirculating bit in register 42 will be shifted or advanced at a relatively slow rate, for example at a 1 kc. rate, under the control of the common control equipment.

As shown in greater detail in FIGS. 3 and 4, each of the address slots of address selector 30 is composed of an 8-bit shift register and appropriate "comparison" logic circuitry to be described hereinafter. Each of the 160 address slots is respectively associated, on a permanent basis, with a given incoming subscriber line. For example, the address slots #7 and #8 are permanently assigned to the incoming lines 11–7 and 11–8, respectively. However, the address data stored in each address slot corresponds to an outgoing line. Thus, if the subscriber on incoming line 11–8 desired to be connected to the subscriber assigned to outgoing line 12–39, a binary coded number corresponding to this outgoing line is stored in address slot #8. This binary coded number (for example, the binary number corresponding to decimal numeral 39)

is retained in address slot #8 for at least the duration of the call.

Considering the circuit now in somewhat greater detail, a bit initially inserted into the recirculating shift register 42 is continuously and successively advanced or shifted therein, in conventional fashion, at a 1 kc. rate. The (1) output lead of the eighth stage 42–8 of the register 42 is connected to the enabling gates 41–8 and 41–8S so that the same are energized when the recirculating bit is advanced to this stage. If there has been a request for service from subscribed 11–8, an appropriately coded binary number will be delivered to the shift register 81 of address slot #8, via the enabled or energized gates 41–8 and 41–8S. The method in which a binary number is inserted into a shift register is well known to those in the art and therefore an explanation of the same at this point is not believed necessary. For the case assumed above, the binary number equivalent of decimal numeral 39 is inserted in conventional serial fashion into register 81. The binary number then remains in this register for the duration of the call.

Each of the eight stages of register 81 is designated with a number in parenthesis indicating the decimal equivalent of the binary stage. Each of the eight stages of the register is arranged in the manner known in the art to supply "two rail logic output signals." In other words, each stage of register 81 has a (0) and a (1) output lead. Because register 81 comprises eight stages, the binary equivalent of any number from 1 to 255 can be stored therein. For example, when the binary equivalent of numeral 69 is inserted in register 81 the stages designated (1), (4) and (64) will be set to their "1" state, and each will provide an energizing signal over its (1) output lead. The remaining stages, of course, remain in the "0" state and provide energizing signals over their (0) output leads.

The binary numbers stored in each of the address slots are continuously compared with signals generated by the line scan generator 50, and when a match occurs therebetween a message gate is opened to read out the appropriate message bit from message store, in a manner to be described hereinafter. The line scan generator 50 comprises a counter of eight binary stages. For purposes of the present invention, it is desirable that the counter count from 1 to 60 and then recycle or repeat the count. Counters of this type are known as decimal or recirculating binary counters, and there are numerous methods known to those in the art for achieving this desired result; see, for example, Pulse and Digital Circuits, by Millman and Taub, McGraw-Hill Book Co., Inc. (1956), page 327 et seq.

Each of the eight stages of the counter 50 is designated with a number in parenthesis indicating the decimal equivalent of the binary stage. Further, each of the eight stages of counter 50 is arranged in the manner known in the art to supply "two rail logic output signals." Thus, each stage of the counter has a (0) and a (1) output lead. These leads extend to each of the address slots, as illustrated in FIGS. 3 and 4. As stated heretofore, the counter is capable of counting from 1 to 160 and hence, as clock pulses from clock pulse source 14 are applied to the input of the counter 50, the counter will count in standard binary fashion the successive pulses applied thereto. For example, when the first clock pulse is applied to stage (1) of the counter 50, this stage will set to its "1" state and will apply an energizing signal over its (1) output lead. When the second clock pulse from clock pulse source 14 is applied to counter 50, stage (1) will be set to its "0" state and stage (2) will be set to its "1" state in typical binary fashion. As succeeding pulses from clock pulse source 14 are applied to the counter, the respective stages will operate in the manner well known in the art.

The counter 50 counts at the scanning rate (that is, 480 kb.), and the successive counts from 1 to 160 are in synchronism with the aforementioned frames.

The two rail logic (0) and (1) output leads from the respective stages of counter 50 are connected to the comparison logic circuitry of each address slot, in the manner illustrated in FIGS. 3 and 4. The logic circuitry of each address slot compares the counter output with the binary number stored therein and when a match occurs the associated message gate is energized or opened to read out the appropriate message bit from message store.

As shown in FIGS. 3 and 4, the (0) and (1) output leads of the first stages of counter 50 and register 81 are connected to the AND gates 1–0 and 1–1, respectively. The (0) and (1) output leads of the second stages of the counter 50 and the register 81 are connected to the AND gates 2–0 and 2–1, respectively, and so on, for each of the respective binary stages of the counter 50 and the shift register 81. Each of the AND gates of the comparison logic of address slot #8 is coupled via a buffer OR gate to the input of the message AND gate 16–8.

The message gate 16–8 is energized only when the count from counter 50 matches the binary encoded address information stored in address slot #8. For the assumed case, this occurs when the counter 50 reaches the binary number equivalent to decimal numeral 69. The (1) output leads of the stages (1), (4) and (64) of counter 50 are then energized, as are the (1) output leads of the corresponding stages of register 81. The remaining stages of the counter 50 and register 81 remain in their "0" state and hence provide energizing signals over their respective (0) output leads. Thus, for this count only, the state of each of the stages of counter 50 exactly matches that of the coresponding stages of register 81. An AND gate associated with each binary stage of register 81 is therefore actuated to deliver an energizing signal to message gate 16–8.

The message gate 16–8 is connected to the (1) output lead of the eighth stage 15–8 of the register 15. Accordingly, when the counter 50 reaches the count 69 the bit, if any, that is stored in message store stage 15–8 will be read out through the message gate 16–8.

The overall result of the above described operation is simply that the bit that had formally occupied time slot eight is effectively shifted, by the controlled read out, to the time slot sixty nine. This operation is repeated for each and every frame, and in like manner for each and every time slot.

By way of further example, if the binary equivalent of decimal numeral 83 is stored in address slot #7, the bit, if any, stored in mesage storage stage 15–7 will be read out when the counter 50 reaches count 83. Thus, the bits that formerly occupied time slot seven of each frame now appear in time slot eighty three. The operation therefore resolves itself into one of changing the time sequence of the incoming multiplexed message bits into a different order, under the control of the forwarding address information stored in address selector 30. And, as stated heretofore, the order of the outgoing message bits corresponds to the outgoing lines to which the respective bits are to be routed.

The bits read out of message store 15 via message gates 16 are delivered in multiplexed fashion over bus 56 to the enabling gate 76. Likewise, the bits read out of message store 25 are delivered over bus 66 to the gate 86. The gates 76 and 86 are respectively connected to the leads 24 and 23 of the flip-flop 20 output. With lead 23 energized, the gates 21 and 86 are enabled to permit read in to message store 15 and read out from message store 25. And when lead 24 is energized, read in is to message store 25, while the read out is from message store 15. This scheme prevents the read out of a message store until a complete frame is stored.

The output transmission busses 56 and 66 are thus alternately coupled, a frame at a time, to the input of the line switching AND gates 91, via OR gate 90. The gates 91 are energized or opened individually and in time sequence under the control of shift register 92. This latter register may comprise any conventional shift register, preferably of the recirculating type, having 160 storage stages. The bit initially inserted in register 92 is shifted or advanced at a 480 kb. rate under the control of clock pulses from the clock pulse source 14, the recycling in register 92 being, of course, in frame synchronism with the other equipment. As described heretofore, the order of the outgoing multiplex message bits on busses 56 and 66 corresponds to that of the outgoing lines to which the bits are to be routed. That is, the bit in the first time slot is to be routed to line 12–1, the bit occupying time slot two is routed to line 12–2, et cetera. This routing is carried out under the control of register 92. At the beginning of each frame, the bit in the recirculating register 92 will appear in the first binary stage thereof to thereby deliver an energizing signal to the AND gate associated with line 12–1. Accordingly, the bit, if any, in the first time slot will be routed to line 12–1.

Upon the arrival of the next clock pulse from source 14 the recirculating bit is shifted to the second binary stage of register 92 and thence the digital data bit, if any, occupying time slot two is routed to line 12–2, and so on. Thus, the incoming lines are respectively connected to the outgoing lines in accordance with the forwarding address information stored in the address selector.

The forwarding address information is retained in an address slot for at least the duration of the call. This information can be "shifted out" or, alternatively, the address slot shift register can be reset, in a conventional manner, prior to the next requested connection.

The scanner 13 is shown in FIG. 1 in proximity to the central office equipment. However, as will be clear to those in the art, the scanner can be located remotely, with the signals then transmitted in multiplexed fashion to the central office over the common transmission bus. Considerable savings in outside cable facilities can be realized in this manner.

For purposes of explanation, the interconnection of 160 incoming lines to the same number of outgoing lines was assumed herein. It should be clear, however, that the instant invention is in no way limited to this number of incoming and outgoing lines. And, the number of incoming lines need not necessarily be the same as the number of outgoing lines. Further, a switching network constructed in accordance with the invention is capable of accommodating both individual lines or trunks or a mixture of both. For example, the assumed total message bit rate (480 kb.) can be divided into 160 3 kb. lines or into 10 48 kb. trunks, with each trunk carrying, in multiplexed fashion, 16 lines at 3 kb. All that is essential in this last regard is that the scanner "rest" long enough on an incoming trunk to transfer the digital data information from the trunk to the switching network. Outgoing trunks may likewise be accommodated in a corresponding fashion.

It is to be understood, therefore, that the above-described embodiment is merely illustrative of the principles and applications of the present invention and that numerous modifications or alterations may be made therein without departing from the spirit and scope of the invention.

What is claimed is:

1. In a switching network, a plurality of incoming lines, each line comprising a train of digital bits, a common transmission bus, means for connecting each of said incoming lines individually and in time sequence to said common transmission bus in a particular one of a plurality of time slots in a repeated cycle defined by said time slots, storage means having a plurality of storage stages equal in number to the number of said time slots in a cycle for storing a cycle at a time the multiplexed digital bits occurring in each of said cycles, a register means permanently associated with each of said storage stages, means for inserting in each of said register means a binary signal identifying a particular one of a plurality of outgoing multiplex channels, counter means coupled to each of said register means and operative to cyclically and sequentially produce binary signals corresponding to each of said outgoing channels, and means coupled to each of said register means for gating out the digital bits of each storage stage when the binary signal output of said counter means corresponds to the binary signal inserted in said associated register means.

2. In a switching network, a common transmission bus carrying a plurality of multiplexed message bits, the bits of any given message occurring in a particular one of a plurality of time slots in a repetitive cycle, storage means having a plurality of storage stages equal in number to the number of said plurality of time slots, means coupling said common transmission bus to said storage means for serially storing a cycle at a time the multiplexed message bits occurring in each of said cycles, a register means permanently associated with each of said storage stages, means for inserting in each of said register means a binary number identifying a particular one of a plurality of outgoing multiplex channels, counter means coupled to each of said register means and operative to cyclically and sequentially produce binary numbers corresponding to each of said outgoing channels, and means coupled to each of said register means for gating out the message bits of each storage stage when the binary number output of said counter means corresponds to the binary number inserted in the associated register means.

3. A digital crosspoint switching network comprising a plurality of incoming channels each of which is adapted to carry a stream of digital message bits, a common transmission bus, means for establishing a connection between each of said channels and said bus in a particular time slot of a plurality of time slots in a predetermined repetitive cycle, storage means having a plurality of storage stages equal in number to the number of time slots in said cycle, means for coupling said bus to said storage means for serially storing a cycle at a time the multiplexed message bits occurring in each of said cycles, a register means continuously associated with each of said storage stages, means inserting in each of said register means a binary number identifying a particular one of a plurality of outgoing multiplexed message channels, counter means for producing in sequence and in a repetitive cycle corresponding to the first mentioned cycle successive binary numbers indicative of said outgoing channels, and gating means coupled to the output of said counter means and to each of said register means for gating out the message bits of each storage stage when the binary number output of said counter means corresponds to the binary number inserted in the associated register means.

4. A digital crosspoint switching network as defined in claim 3 wherein said storage means comprises a pair of shift registers to permit read in to one register concurrently with read out from the other.

5. A digital crosspoint switching network as set forth in claim 3 further comprising a plurality of outgoing lines, a line gate means for each of said outgoing lines, means coupling said outgoing multiplexed message channels to the input of each of said line gate means, and actuating means connected to the input of each of said line gate means for sequentially energizing the same individually and in a repetitive cycle corresponding to the first-mentioned cycle.

6. A time division switching network for digital data traffic comprising a common transmission bus carrying a plurality of multiplexed message bits, the bits of any given message occurring in a particular one of a plurality of time slots in a repetitive cycle, a pair of storage devices each having a plurality of storage stages equal in number to the number of said plurality of time slots in a repetitive cycle, means for coupling said common transmission bus to said storage devices alternately and cyclically to store a cycle at a time the multiplexed message bits occurring in each of said cycles, a register means associated with each of the corresponding storage stages of said storage devices, means inserting in each of said register means a binary number identifying a particular one of a plurality of outgoing multiplexed message channels, counter means for producing in sequence and in a repetitive cycle synchronous with the first-mentioned cycle successive binary numbers indicative of said outgoing channels, and gating means coupled to the output of said counter means and to each of said register means for gating out the message bits of each storage stage when the binary number output of said counter means corresponds to the binary number inserted in the associated register means.

7. A time division switching network as defined in claim 6 wherein the last-recited means includes means for preventing read out from a storage device while the same is operatively coupled to said common transmission bus.

8. In combination, a plurality of incoming lines each of which is adapted to carry a stream of digital data bits, a common transmission bus, means for establishing a connection between each of said lines and said bus in a particular time slot of a plurality of time slots in a predetermined repetitive cycle, a pair of storage devices each having a plurality of storage stages equal in number to the number of said plurality of time slots in a repetitive cycle, means for coupling said common transmission bus to said storage devices alternately and cyclically to store a cycle at a time the multiplexed message bits occurring in each of said cycles, a register means associated with each of the corresponding storage stages of said storage devices, means inserting in each of said register means a binary number identifying a particular one of a plurality of outgoing multiplexed message channels, counter means for producing in sequence and in a repetitive cycle synchronized with the first-mentioned cycle successive binary numbers indicative of said outgoing channels, gating means coupled to the output of said counter means and to each of said register means for gating out to a common outgoing bus the data bits of each storage stage when the binary number output of said counter means corresponds to the binary number inserted in the associated register means, said gating means including means for preventing read out from a storage device while the same is operatively coupled to said common transmission bus, a plurality of outgoing lines, line gating means for each of said outgoing lines, means coupling the common outgoing bus carrying the outgoing multiplexed message channels to the input of each of said line gate means, and actuating means connected to the input of each of said line gate means for sequentially energizing the same individually and in a repetitive cycle synchronous with the first-mentioned cycle.

References Cited by the Examiner

UNITED STATES PATENTS 2,786,891 3/1957 Flowers -------------- 178—15

DAVID G. REDINBAUGH, *Primary Examiner.*